(12) United States Patent
Kim et al.

(10) Patent No.: US 11,964,599 B2
(45) Date of Patent: Apr. 23, 2024

(54) DEVICE FOR PREVENTING SUBMARINE PHENOMENON IN FOLD AND DIVE SEAT FOR VEHICLE

(71) Applicants: HYUNDAI MOTOR COMPANY, Seoul (KR); KIA MOTORS CORPORATION, Seoul (KR)

(72) Inventors: Bong Ku Kim, Seoul (KR); Sang Do Park, Suwon-si (KR); Ho Suk Jung, Hwaseong-si (KR); Chan Ho Jung, Gunpo-si (KR); Deok Soo Lim, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 523 days.

(21) Appl. No.: 17/196,383

(22) Filed: Mar. 9, 2021

(65) Prior Publication Data

US 2022/0105985 A1 Apr. 7, 2022

(30) Foreign Application Priority Data

Oct. 6, 2020 (KR) .......................... 10-2020-0128457

(51) Int. Cl.
*B60N 2/427* (2006.01)
*B60N 2/42* (2006.01)
(Continued)

(52) U.S. Cl.
CPC ....... *B60N 2/42781* (2013.01); *B60N 2/4221* (2013.01); *B60N 2/64* (2013.01); *B60N 2/68* (2013.01)

(58) Field of Classification Search
CPC .............. B60N 2/4221; B60N 2/42718; B60N 2/42781; B60N 2/43; B60N 2/433; B60N 2/64; B60N 2/68
(Continued)

(56) References Cited

U.S. PATENT DOCUMENTS 6,050,635 A 4/2000 Pajon et al.
6,505,888 B1* 1/2003 Teufel .................. B60N 2/4221
297/344.15
(Continued)

FOREIGN PATENT DOCUMENTS

JP 2011-016482 A 1/2011
KR 2009-0050683 A 5/2009
(Continued)

*Primary Examiner* — Amy R Weisberg
*Assistant Examiner* — Wenwei Zhuo
(74) *Attorney, Agent, or Firm* — MCDONNELL BOEHNEN HULBERT & BERGHOFF LLP (57) ABSTRACT

A device for preventing a submarine phenomenon in a fold and dive seat for a vehicle includes a seat cushion side frame, a seat back frame fastened to a rear end portion of the seat cushion side frame in a manner that is rotatable backward and forward, a seat cushion main-frame fastened between the seat cushion side frame and the seat back frame in a tiltable manner, and a dive link fastened by a hinge mechanism between a front end portion of the seat cushion main-frame and a front end portion of the seat cushion side frame, in which a stopper link rotatably mounted on the seat cushion side frame is rotated by an inertial force when a head-on collision occurs, and thus holds the dive link in place.

8 Claims, 5 Drawing Sheets

(51) Int. Cl.
*B60N 2/64* (2006.01)
*B60N 2/68* (2006.01)

(58) Field of Classification Search
USPC .......................................... 296/187.03, 68.1
See application file for complete search history.

(56) References Cited

U.S. PATENT DOCUMENTS

| | | | | |
|---|---|---|---|---|
| 9,108,539 | B2* | 8/2015 | Park | B60N 2/4228 |
| 11,279,260 | B2* | 3/2022 | Kim | B60N 2/3065 |
| 11,618,351 | B2* | 4/2023 | Kim | B60N 2/02246 |
| | | | | 297/362 |
| 2001/0045766 | A1* | 11/2001 | Deptolla | B60N 2/433 |
| | | | | 297/216.2 |
| 2002/0011746 | A1* | 1/2002 | Muhlberger | B60N 2/4221 |
| | | | | 297/344.12 |
| 2002/0089225 | A1* | 7/2002 | Bruck | B60N 2/2352 |
| | | | | 297/378.11 |
| 2003/0213885 | A1* | 11/2003 | Schumann | B60N 2/433 |
| | | | | 248/419 |
| 2004/0075313 | A1* | 4/2004 | Taoka | B60N 2/2887 |
| | | | | 297/216.16 |
| 2005/0275267 | A1* | 12/2005 | Schumann | B60N 2/4214 |
| | | | | 297/344.12 |
| 2012/0139306 | A1* | 6/2012 | Jeong | B60N 2/167 |
| | | | | 297/344.15 |
| 2016/0052428 | A1* | 2/2016 | Hessdörfer | B60N 2/753 |
| | | | | 297/411.32 |
| 2017/0001546 | A1* | 1/2017 | Keyser | B60N 2/2227 |
| 2018/0194249 | A1* | 7/2018 | Schueler | B60N 2/1615 |
| 2019/0106028 | A1* | 4/2019 | Kitagawa | B60N 2/42 |

FOREIGN PATENT DOCUMENTS

| | | | |
|---|---|---|---|
| KR | 2016-0056047 | A | 5/2016 |
| KR | 101755993 | B1 | 7/2017 |
| KR | 102060093 | B1 * | 12/2019 |

* cited by examiner

DEVICE FOR PREVENTING SUBMARINE PHENOMENON IN FOLD AND DIVE SEAT FOR VEHICLE

CROSS REFERENCE TO RELATED APPLICATIONS

The present application claims priority to Korean Patent Application No. 10-2020-0128457, filed Oct. 6, 2020, the entire contents of which is incorporated herein for all purposes by this reference.

BACKGROUND

Field

The present disclosure relates to a device for preventing a submarine phenomenon in a fold and dive seat for a vehicle and, more particularly, to a device for preventing a submarine phenomenon in a fold and dive seat for a vehicle, in which a front end portion of the fold and dive seat descends when a collision occurs, thereby readily preventing the submarine phenomenon that causes injury to an occupant.

Description of the Related Art

Generally, a submarine phenomenon occurring in a seat for a vehicle refers to a phenomenon where a front end portion of a seat cushion is instantaneously moved downward due to deformation of the seat when a head-on collision occurs.

When the submarine phenomenon occurs, an upper body of an occupant sitting to the seat is moved frontward or downward, and thus pressure against the abdomen of the occupant is suddenly increased, which can cause fatal injury to the occupant.

Particularly, a fold and dive seat has a disadvantage in which the submarine phenomenon occurs more easily because of a characteristic function and structure thereof.

In a case where a long-sized object or the like is loaded in space behind a seat back, a folding operation of bringing a seat back in contact with a seat cushion and a dive operation of causing a front portion of the seat back to descend to make a rear surface of the seat back horizontally flat need to be carried out to secure more space behind the seat back. The fold and dive seat refers to a seat that is capable of carrying out these operations.

Configuration and operation of a fold and dive seat in the related art will be described below.

Figure 1:
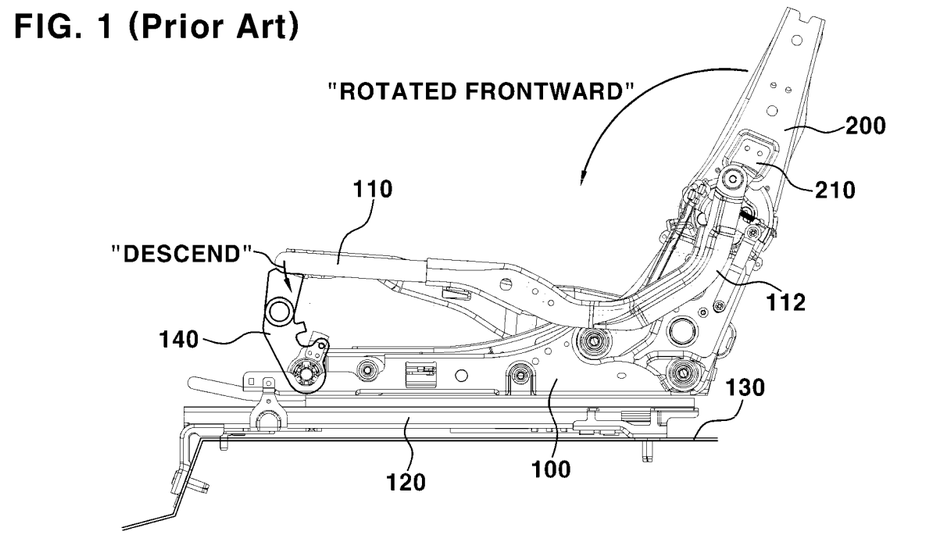
FIG. 1 is a side view illustrating a fold and dive seat in the related art.

FIG. 1 is a side view illustrating an example of the fold and dive seat in the related art.

As illustrated in FIG. 1, the fold and dive seat includes a seat cushion side frame 100, a seat back frame 200, and a seat cushion main-frame 110. The seat cushion side frame 100 is mounted on a floor panel 130 in a manner that is movable backward and forward along a seat rail 120. The seat back frame 200 is fastened on a rear end portion of the seat cushion side frame 100 in a manner that is reclinable. The seat cushion main-frame 110 is fastened between the seat cushion side frame 100 and the seat back frame 200 in a manner that can be tilted.

In the fold and dive seat, a connection frame 112, which extends to the seat back frame 200, is integrally combined with a rear end portion of the seat cushion main-frame 110. A rear end portion of the connection frame 112 is fastened by a hinge mechanism to a hinge bracket 210 integrally combined with the seat back frame 200.

In addition, a dive link 140 is fastened by the hinge mechanism between a front end portion of the seat cushion main-frame 110 and a front end portion of the seat cushion side frame 100.

With this configuration, when bringing a seat back into contact with a seat cushion, that is, when rotating the seat back frame 200 frontward, in order to make the rear surface of the seat back horizontally flat, a dive operation of causing a front end portion of the seat cushion main-frame 110 to descend is carried out at the same time as the dive link 140 is rotated downward by a predetermined angle.

Figure 2:
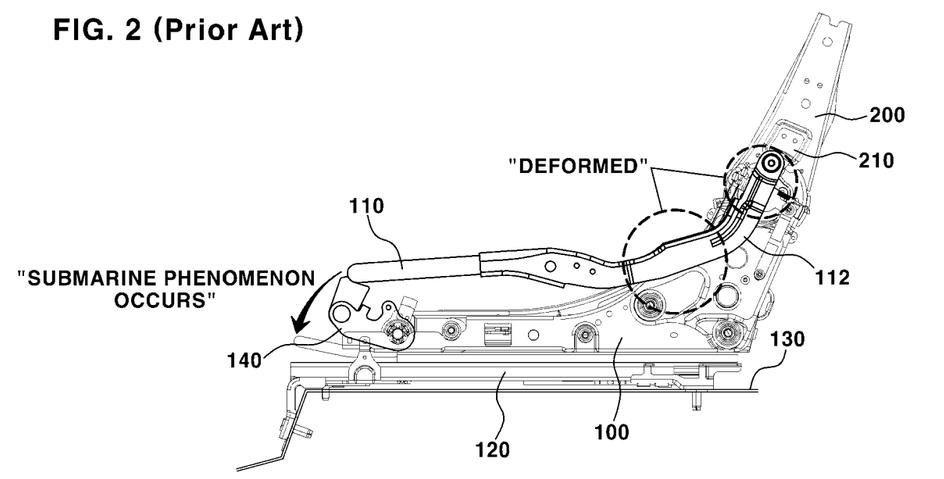
FIG. 2 is a side view illustrating an example where a submarine phenomenon occurs in the fold and dive seat in the related art when a head-on collision occurs.

In the fold and dive seat, as illustrated in FIG. 2, when the seat cushion main-frame 110, the connection frame 112, and the like are deformed due to impact in a head-on collision, the dive link 140 is also deformed because an angle by which the dive link 140 is rotated downward is further increased. Thus, the submarine phenomenon where a front end portion of the seat cushion is instantaneously moved downward occurs easily.

Moreover, both end portions of the dive link 140 are fastened by a free stop hinge mechanism to a front end portion of the seat cushion main-frame 110 and a front end portion of the seat cushion side frame 100, respectively. Because of this, the dive link 140 is easily deformed when a head-on collision occurs. This deformation increases the submarine phenomenon.

The foregoing is intended merely to aid in the understanding of the background of the present disclosure, and is not intended to mean that the present disclosure falls within the purview of the related art that is already known to those skilled in the art.

SUMMARY

An objective of the present disclosure is to provide a device for preventing a submarine phenomenon in a fold and dive seat for a vehicle. The device is capable of holding a dive link of the fold and dive seat in place using a stopper link that is set in inertial motion when a head-on collision occurs. Thus, the device is capable of preventing deformation of the dive link and at the same time readily preventing a submarine phenomenon.

According to an aspect of the present disclosure, there is provided a device for preventing a submarine phenomenon in a fold and dive seat for a vehicle, the device including a seat cushion side frame, a seat back frame fastened to a rear end portion of the seat cushion side frame in a manner that is rotatable backward and forward, a seat cushion main-frame fastened between the seat cushion side frame and the seat back frame in a tiltable manner, and a dive link fastened by a hinge mechanism between a front end portion of the seat cushion main-frame and a front end portion of the seat cushion side frame, in which a stopper link rotatably mounted on the seat cushion side frame is rotated by an inertial force when a head-on collision occurs, and thus holds the dive link in place.

In the device, the stopper link may include a mounting bar, fastened to the seat cushion side frame in a manner that is rotatable about a hinge pin, a locking block integrally combined with an upper end portion of the mounting bar to hold the dive link in place, and an elastic member integrally combined with a lower end portion of the mounting bar and configured to provide an inertial motive force to the stopper link when the head-on collision occurs.

In the device, the dive link may have a longitudinal through-hole in a front end portion thereof, the locking block being inserted into the longitudinal through-hole to hold the dive link in place.

In the device, the longitudinal through-hole may have a toothed holding portion on a rear surface thereof, and the locking block has a toothed driving portion on a rear surface, the toothed driving portion being engaged with the toothed holding portion when the stopper link is set in inertial motion due to the head-on collision.

In the device, a return spring that is provided on the hinge pin, the return spring being configured to provide an elastic restoration force for frontward rotation to the mounting bar of the stopper link in such a manner as to bring the locking block into close contact with a front surface of a longitudinal through-hole in the dive link.

In the device, in a state where the return string is wound about the hinge pin, a first end portion of the return string may be locked to the seat cushion side frame and a second end portion thereof may be locked to the mounting bar of the stopper link.

In the device, when the dive link is rotated for a dive operation, the locking block may be rotated frontward by the elastic restoration force of the return spring and may remain brought into close contact with a front surface of the longitudinal through-hole in the dive link.

In the device, when the head-on collision occurs, the elastic member of the stopper link may resist the elastic restoration force of the return spring with the inertial force and may be rotated frontward, and at the same time, the locking block may be rotated rearward, thereby engaging a toothed driving portion of the locking block with a toothed holding portion of a rear surface of the longitudinal through-hole.

The device for preventing a submarine phenomenon in a fold and dive seat for a vehicle according to the present disclosure provides the following advantage.

According to the present disclosure, a stopper link that is possibly set in inertial motion is rotatably mounted in the vicinity of a dive link of a fold and dive seat. When a head-on collision occurs, the stopper link is rotated while being set in inertial motion, thereby holding a dive link in place. Thus, deformation of the dive link can be prevented, and at the same time the submarine phenomenon can be readily prevented.

BRIEF DESCRIPTION OF THE FIGURES

The above and other objectives, features, and other advantages of the present disclosure will be more clearly understood from the following detailed description when taken in conjunction with the accompanying drawings, in which.

DETAILED DESCRIPTION

A preferable embodiment of the present disclosure will be described in detail below with reference to the accompanying drawings.

Figure 3:
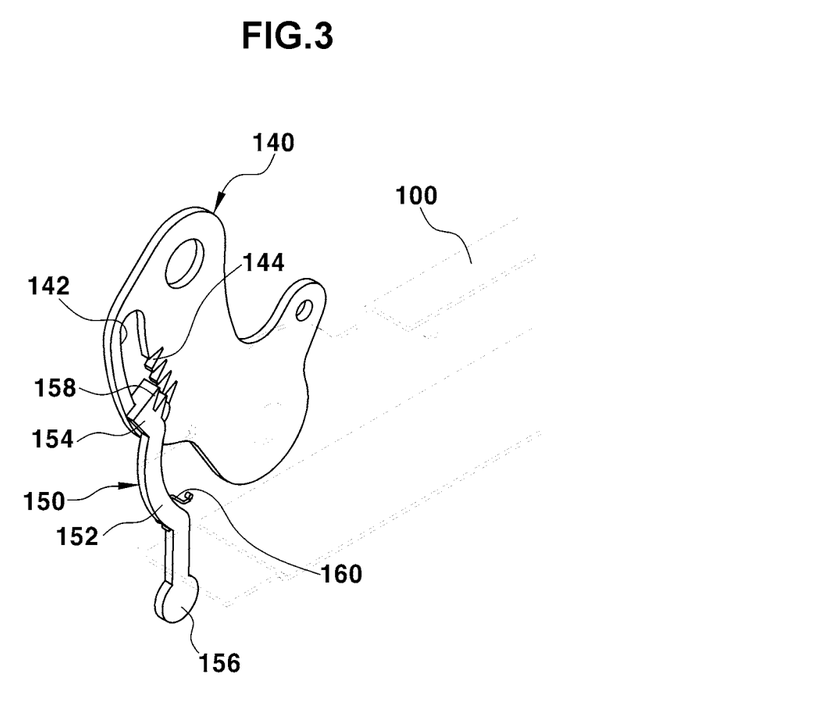
FIGS. 3 and 4 are perspective views each illustrating a device for preventing a submarine phenomenon according to the present disclosure.
Figure 4:
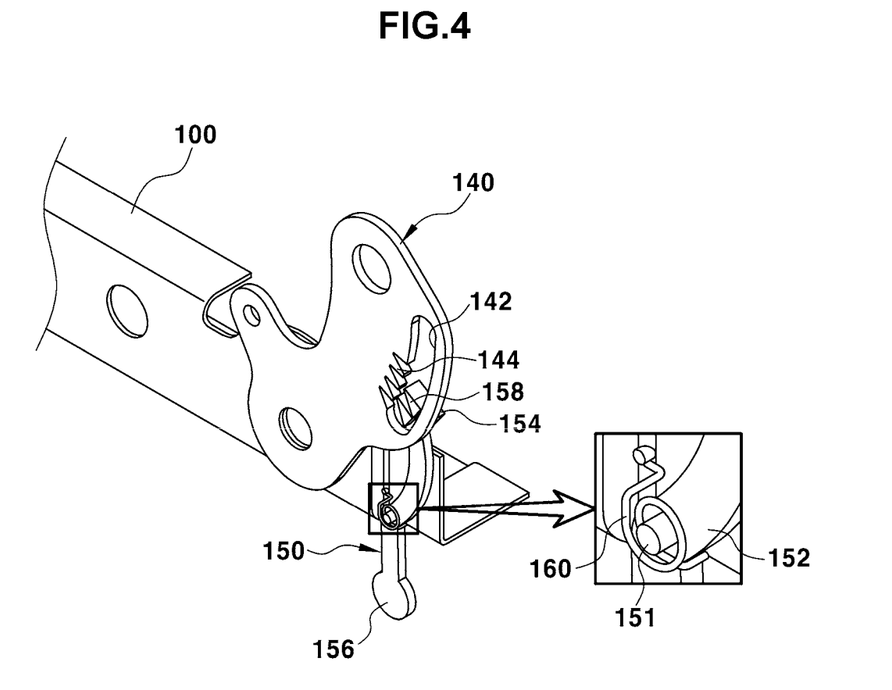
Figure 5:
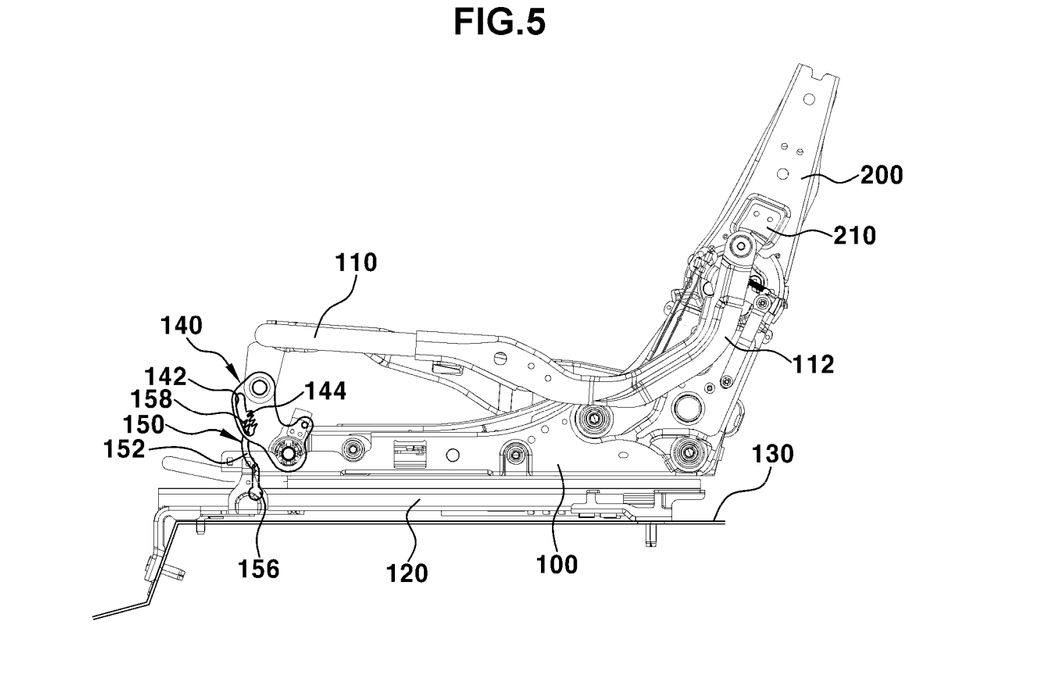
FIG. 5 is a side view illustrating a state where the device for preventing a submarine phenomenon according to the present disclosure is mounted on a fold and dive seat.

FIGS. 3 and 4 are perspective views each illustrating a device for preventing a submarine phenomenon according to the present disclosure. FIG. 5 is a side view illustrating a state where the device for preventing a submarine phenomenon according to the present disclosure is mounted on a fold and dive seat.

As illustrated in FIG. 5, the fold and dive seat includes a seat cushion side frame 100, a seat back frame 200, a seat cushion main-frame 110, and the like. The seat cushion side frame 100 is mounted on a floor panel 130 in a manner that is movable backward and forward along a seat rail 120. The seat back frame 200 is fastened on a rear end portion of the seat cushion side frame 100 in a manner that is reclinable. The seat cushion main-frame 110 is fastened between the seat cushion side frame 100 and the seat back frame 200 in a manner that is enabled to be tilted.

A dive link 140 is fastened by a hinge mechanism between a front end portion of the seat cushion main-frame 110 and a front end portion of the seat cushion side frame 100.

Particularly, a stopper link 150 is mounted at a predetermined position on the seat cushion side frame 100 in a manner that is rotatable by an inertial force when a head-on collision occurs, and thus is positioned before the dive link 140.

Accordingly, when a head-on collision occurs, the stopper link 150 is instantaneously rotated by the inertial force, thereby holding the dive link 140 in place. This instantaneous rotation prevents the dive link 140 from being moved and at the same time prevents the dive link 140 from being deformed.

To this end, the stopper link 150, as illustrated in FIGS. 3 and 4, includes a mounting bar 152, a locking block 154, and an elastic member 156 having a rounded shape. The mounting bar 152 is fastened to the seat cushion side frame 100 in a manner that is rotatable about a hinge pin 151. The locking block 154, integrally combined with an upper end portion of the mounting bar 152 in a protruding manner, holds the dive link 140 in place. The elastic member 156, formed on a lower end portion of the mounting bar 152, provides an inertial motive force to the stopper link 150 when a head-on collision occurs.

The dive link 140 has a longitudinal through-hole 142 in the front end portion. The longitudinal through-hole 142 runs along an upward-downward direction.

Accordingly, the locking block 154 of the stopper link 150 is inserted into the longitudinal through-hole 142 in the dive link 140 and is positioned to hold the dive link 140 in place.

It is desirable that the longitudinal through-hole 142 has a toothed holding portion 144 on the rear surface, and that the locking block 154 has a toothed driving portion 158 on the rear surface. The toothed driving portion 158 is engaged with the toothed holding portion 144 when the stopper link 150 is rotated by the inertial force due to the head-on collision.

A return spring 160 is wound about the hinge pin 151. The return spring 160 provides an elastic restoration force for frontward rotation to the mounting bar 152 of the stopper link 150. A first end portion of the return spring 160 is locked to the seat cushion side frame 100, and a second end portion thereof is locked to a front end portion of the mounting bar 152.

It is desirable that the second end portion of the return spring 160 is locked to the front end portion of the mounting bar 152 that is positioned at a lower height than the hinge pin 151. This is done for the return spring 160 to exert an elastic restoration force for rotating the upper end portion (positioned over the hinge pin 151) of the mounting bar 152 frontward.

Accordingly, the upper end portion (positioned over the hinge pin 151) of the mounting bar 152 is rotated frontward by the elastic restoration force of the return spring 160. Thus, the locking block 154 integrally combined with the upper end portion of the mounting bar 152 maintains a state of being always brought into close contact with a front surface of the longitudinal through-hole 142 in the dive link 140 before the head-on collision occurs.

A flow for operation of the device for preventing a submarine phenomenon according to the present disclosure, which is configured as described above, will be described blow.

Figure 6:
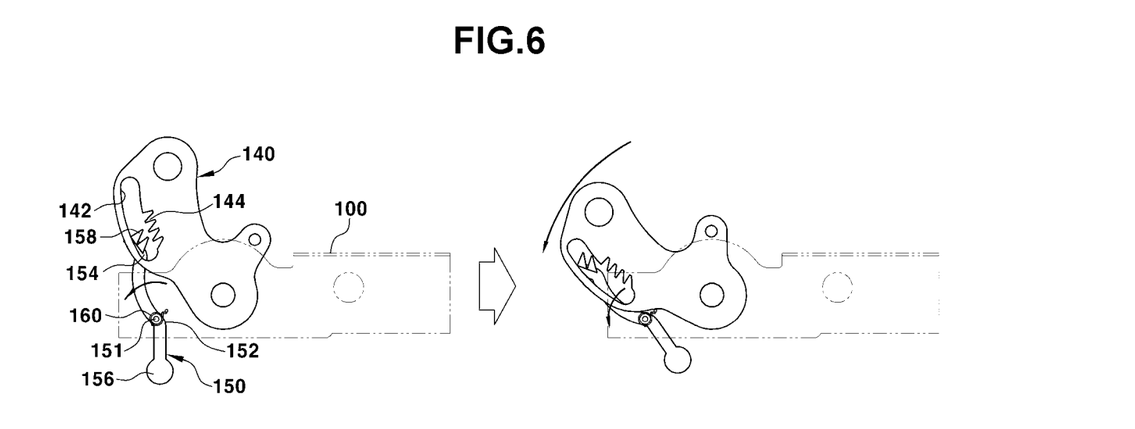
FIG. 6 is a side view illustrating a state where the device for preventing a submarine phenomenon according to the present disclosure operates when carrying out a fold and dive operation.

FIG. 6 is a side view illustrating a state where the device for preventing a submarine phenomenon according to the present disclosure operates when carrying out a fold and dive operation.

In a state where an occupant can sit on a seat cushion, the dive link 140 remains almost in the upright position, and the upper end portion of the mounting bar 152 that constitutes the stopper link 150 tends to be rotated frontward by the elastic restoration force of the return spring 160. Thus, as illustrated in FIG. 6, the locking block 154 integrally combined with the upper end portion of the mounting bar 152 is in the state of being brought into close contact with the front surface of the longitudinal through-hole 142 in the dive link 140.

In this state, when bringing the seat back into contact with the seat cushion, that is, when rotating the seat back frame 200 frontward, in order to make the rear surface of the seat back horizontally flat, the dive link 140 is rotated downward by a predetermined angle in a frontward direction, and thus a dive operation of causing the front end portion of the seat cushion main-frame 110 to descend is carried out.

At this time, even when the dive link 140 is rotated downward by a predetermined angle in the frontward direction, the elastic restoration force of the return spring 160 continues to be exerted on the mounting bar 152 of the stopper link 150. Therefore, the locking block 154 integrally combined with the upper end portion of the mounting bar 152 is in the state of being brought into close contact with the front surface of the longitudinal through-hole 142 in the dive link 140.

In addition, the toothed holding portion 144 of the rear surface of the longitudinal through-hole 142 and the toothed driving portion 158 of the rear surface of the locking block 154 remain positioned at a distance away from each other.

Therefore, the dive operation of the fold and dive seat is readily carried out by the frontward and downward rotation of the dive link 140 without any interference by the stopper link 150.

Figure 7:
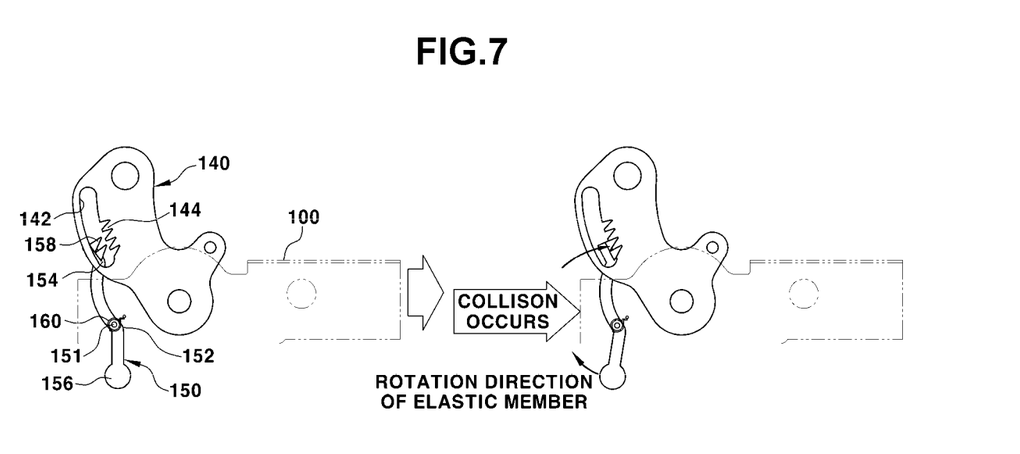
FIG. 7 is a side view illustrating a state where the device for preventing a submarine phenomenon according to the present disclosure operates when a head-on collision occurs.

FIG. 7 is a side view illustrating a state where the device for preventing a submarine phenomenon according to the present disclosure operates when a head-on collision occurs.

The mounting bar 152 of the stopper link 150 is rotated by the inertial force in the opposite direction when a head-on collision occurs, and thus the dive link 140 is held in place. This can prevent the deformation of the dive link 140 and at the same time can readily prevent the submarine phenomenon.

More particularly, when the head-on collision occurs, the elastic member 156 of the stopper link 150 resists the elastic restoration force of the return spring 160 with the inertial force and is rotated frontward, and at the same time, the locking block 154 is rotated rearward. Thus, the toothed driving portion 158 of the locking block 154 is engaged with the toothed holding portion 144 of the rear surface of the longitudinal through-hole 142. This engaging holds the dive link 140 in place. Thus, the dive link 140 cannot be moved.

In this manner, when a head-on collision occurs, the engaging of the toothed driving portion 158 of the locking block 154 with the toothed holding portion 144 of the rear surface of the longitudinal through-hole 142 holds the dive link 140 in place, and thus the deformation of the dive link 140 can be prevented and the submarine phenomenon due to the deformation of the dive link in the related art can be readily prevented.

Although the specific embodiment of the present disclosure has been described for illustrative purposes, those skilled in the art will appreciate that various modifications, additions and substitutions are possible, without departing from the scope and spirit of the disclosure as disclosed in the accompanying claims.

The invention claimed is:

1. A device for preventing a submarine phenomenon in a fold and dive seat for a vehicle, the device comprising:
   a seat cushion side frame;
   a seat back frame rotatably fastened to a rear end portion of the seat cushion side frame;
   a seat cushion main-frame fastened between the seat cushion side frame and the seat back frame in a tiltable manner; and
   a dive link fastened by a hinge mechanism between a front end portion of the seat cushion main-frame and a front end portion of the seat cushion side frame;
   wherein a stopper link rotatably mounted on the seat cushion side frame is rotated by an inertial force when a head-on collision occurs, holding the dive link in place; and
   wherein the stopper link includes an elastic member integral with a lower end portion of the stopper link and configured to provide an inertial motive force to the stopper link when the head-on collision occurs.

2. The device of claim 1, wherein the stopper link comprises:
   a mounting bar rotatably fastened to the seat cushion side frame about a hinge pin; a locking block integral with an upper end portion of the mounting bar to hold the dive link in place; and
   the elastic member integral with a lower end portion of the mounting bar and configured to provide the inertial motive force to the stopper link when the head-on collision occurs.

3. The device of claim 2, wherein the dive link has a longitudinal through-hole in a front end portion thereof, the locking block being inserted into the longitudinal through-hole to hold the dive link in place.

4. The device of claim 3, wherein the longitudinal through-hole has a toothed holding portion on a rear surface thereof, and the locking block has a toothed driving portion on a rear surface thereof, the toothed driving portion being engaged with the toothed holding portion when the stopper link is set in inertial motion due to the head-on collision.

5. The device of claim 2, wherein a return spring is provided on the hinge pin, the return spring being configured to provide an elastic restoration force for frontward rotation to the mounting bar of the stopper link to bring the locking block into close contact with a front surface of a longitudinal through-hole in the dive link.

6. The device of claim 5, wherein, in a state where the return string is wound about the hinge pin, a first end portion of the return string is locked to the seat cushion side frame, and a second end portion thereof is locked to the mounting bar of the stopper link.

7. The device of claim 5, wherein, when the dive link is rotated for a dive operation, the locking block is rotated frontward by the elastic restoration force of the return spring and maintains close contact with a front surface of the longitudinal through-hole in the dive link.

8. The device of claim 5, wherein, when the head-on collision occurs, the elastic member of the stopper link resists the elastic restoration force of the return spring with the inertial force and is rotated frontward, and at the same time, the locking block is rotated rearward, thereby engaging a toothed driving portion of the locking block with a toothed holding portion of a rear surface of the longitudinal through-hole.

\* \* \* \* \*